US012777099B2

(12) United States Patent
Keränen et al.

(10) Patent No.: US 12,777,099 B2
(45) Date of Patent: Oct. 27, 2026

(54) PROVISION OF NETWORK ACCESS INFORMATION FOR A COMPUTING DEVICE

(71) Applicant: Telefonaktiebolaget LM Ericsson (PUBL), Stockholm (SE)

(72) Inventors: Ari Keränen, Helsinki (FI); Klaus Hartke, Lucerne (CH); Gonzalo Camarillo Gonzalez, Helsinki (FI); Jaime Jiménez, Espoo (FI)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 4 days.

(21) Appl. No.: 18/005,901

(22) PCT Filed: Jul. 22, 2020

(86) PCT No.: PCT/EP2020/070719
§ 371 (c)(1),
(2) Date: Jan. 18, 2023

(87) PCT Pub. No.: WO2022/017600
PCT Pub. Date: Jan. 27, 2022

(65) Prior Publication Data
US 2023/0281262 A1 Sep. 7, 2023

(51) Int. Cl.
*H04L 67/51* (2022.01)
*G06F 16/955* (2019.01)
*H04L 67/04* (2022.01)

(52) U.S. Cl.
CPC .......... *H04L 67/51* (2022.05); *G06F 16/9566* (2019.01); *H04L 67/04* (2013.01)

(58) Field of Classification Search
CPC ....... H04L 67/146; H04L 67/51; H04L 67/04; H04L 67/12; H04L 41/0233;
(Continued)

(56) References Cited

U.S. PATENT DOCUMENTS

2015/0264134 A1* 9/2015 Dong ...................... H04L 67/51
709/204
2016/0014679 A1* 1/2016 Taneja .................... H04W 4/70
455/434
(Continued)

FOREIGN PATENT DOCUMENTS

CN 101253738 A * 7/2006
CN 105766004 A 7/2016
(Continued)

OTHER PUBLICATIONS

Martins et al., "Hypermedia APIs for the Web of Things", IEEE Access, Sep. 2017 (Year: 2017).*
(Continued)

*Primary Examiner* — Jungwon Chang
(74) *Attorney, Agent, or Firm* — Baker Botts L.L.P.

(57) ABSTRACT

A computing device is disclosed that comprises processing circuitry configured to cause the computing device to expose (110), to an application server, at least one resource hosted by the computing device, and to provide (120), to the application server, a hypermedia document that provides access to a value of a parameter characterising access of the computing device to a communication network over which the computing device is operable to communicate. The hypermedia document conforms to a data model for use by constrained devices. Also disclosed is an application server that is operable to use the value of the parameter provided in the hypermedia document to prepare an interaction with the resource hosted by the computing device. Methods performed by a computing device and application server are also disclosed.

10 Claims, 7 Drawing Sheets

(58) Field of Classification Search

CPC ..... H04L 41/5041; H04L 41/02; H04L 67/34; H04W 4/70; G06F 16/9566

USPC .......................................................... 709/224

See application file for complete search history.

(56) References Cited

U.S. PATENT DOCUMENTS

| | | | | |
|---|---|---|---|---|
| 2016/0337216 | A1* | 11/2016 | Kaushik | H04L 43/50 |
| 2017/0208139 | A1* | 7/2017 | Li | H04L 67/51 |
| 2017/0251325 | A1* | 8/2017 | Sakamoto | H04L 61/35 |
| 2018/0041566 | A1* | 2/2018 | Huang | H04L 41/0233 |
| 2018/0102934 | A1* | 4/2018 | Ly | H04L 41/02 |
| 2021/0211509 | A1* | 7/2021 | Ly | H04L 41/5041 |
| 2021/0219117 | A1* | 7/2021 | Novo Diaz | H04L 67/51 |
| 2022/0407786 | A1* | 12/2022 | Jiménez | H04L 67/34 |

FOREIGN PATENT DOCUMENTS

| | | | |
|---|---|---|---|
| CN | 105808313 | A | 7/2016 |
| CN | 106797392 | A | 5/2017 |
| CN | 107836103 | A | 3/2018 |
| CN | 108293062 | A | 7/2018 |
| CN | 109997114 | A | 7/2019 |
| WO | 2019 192722 | A1 | 10/2019 |

OTHER PUBLICATIONS

3GPP TS 23.682 V16.7.0, Jul. 2020, 3rd Generation Partnership Project; Technical Specification Group Services and System Aspects; Architecture enhancements to facilitate communications with packet data networks and applications (Release 16).

K. Hartke, Ericsson "The Constrained RESTful Application Language (CoRAL)", CoRE Working Group, Internet-Draft, Intended status: Standards Track—Mar. 9, 2020.

PCT Notification of Transmittal of the International Search Report and the Written Opinion of the International Searching Authority, or the Declaration issued for International application No. PCT/EP2020/070719—Apr. 16, 2021.

Darrell Miller et al., "Open API Specification" version 3.0.3, Copyright 2020 the Linux Foundation, published Feb. 20, 2020.

China Patent Office, Official Action in CN Application No. 202080105322.6 dated Jul. 25, 2024 (with translation).

China Patent Office, Official Action in CN Application No. 202080105322.6 dated Jan. 9, 2025 (machine translated).

Zhang Xiang, Li Shining, Yao Gaoxue, "Research on plug-and-play technology for IoT devices," Elecronic Design Engineering, vol. 21, Issue 15, Aug. 2013. (Machine Translated).

Wang Pingquan, Luo Hong, Sun Yan, A multivariate identity mapping model for the Internet of Things, Science China Press, Issue 10:1244-1264, 2013 (Science in China: information science; www.scichina.com; info.scichina.com). (Machine Translated).

* cited by examiner

PROVISION OF NETWORK ACCESS INFORMATION FOR A COMPUTING DEVICE

PRIORITY

This nonprovisional application is a U.S. National Stage Filing under 35 U.S.C. § 371 of International Patent Application Serial No. PCT/EP2020/070719 filed Jul. 22, 2020 and entitled "Provision of Network Access Information for a Computing Device" which is hereby incorporated by reference in its entirety.

TECHNICAL FIELD

The present disclosure relates to a computing device, an application server, a method performed by a computing device, a method performed by an application server, and to corresponding computer programs and computer program products.

BACKGROUND

The "Internet of Things" (IoT) refers to devices enabled for communication network connectivity, so that these devices may be remotely managed, and data collected or required by the devices may be exchanged between individual devices and between devices and application servers. Such devices, examples of which may include sensors and actuators, are often, although not necessarily, subject to severe limitations on processing power, storage capacity, energy supply, device complexity and/or network connectivity, imposed by their operating environment or situation, and may consequently be referred to as constrained devices. Constrained devices may operate according to a range of protocols, including widely used protocols such as the Internet Protocol (IP) v4 or IPv6 and Hypertext Transfer Protocol (HTTP), and dedicated protocols for constrained devices such as the Constrained Application Protocol (CoAP).

In many cases, the optimal manner in which to interact with an IoT device is dependent upon capabilities of the communication network to which the device is connected. Different communication network access technologies are optimised for different types of interaction pattern at different times. For example, a Third Generation Partnership Project (3GPP) Cellular IoT (C-IoT) device may use a range of different settings for Discontinuous Reception (DRX) cycles, or a Long Range Wide Area Network (LoRaWAN) device could at times only have unidirectional network access. Overall, Fifth Generation (5G) networks and access technologies include rich set of capabilities that may be used in IoT scenarios if the relevant applications were made aware of such capabilities and able to utilize them.

Among the functions operating on the network that have been defined by 3GPP, the Service Capability Enablement Function (SCEF) exposes limited User Equipment (UE) information, such as (approximate) location, subscription status, uptime, etc. This information is stored in the SCEF and may be accessed by application servers via a dedicated interface (API). However, the API is specific to the SCEF and therefore requires SCEF API implementation for an application to be able take advantage of it. An additional challenge in the context of IoT is that IoT devices currently do not provide network access information, and consequently no vocabularies exist that allow for representing such information. API specification formats such as OpenAPI could be used to provide a static description of the Uniform Resource Locators (URLs) and interactions of an IoT device. However, such formats are not capable of providing dynamic information, such as information relating to changing network conditions.

SUMMARY

It is an aim of the present disclosure to provide a computing device, an application server, methods and a computer readable medium which at least partially address one or more of the challenges discussed above.

According to a first aspect of the present disclosure, there is provided a computing device comprising processing circuitry configured to cause the computing device to expose, to an application server, at least one resource hosted by the computing device and to provide, to the application server, a hypermedia document that provides access to a value of a parameter characterising access of the computing device to a communication network over which the computing device is operable to communicate. The hypermedia document conforms to a data model for use by constrained devices.

According to another aspect of the present disclosure, there is provided an application server comprising processing circuitry configured to cause the application server to discover at least one resource hosted by a computing device, and to receive, from the computing device, a hypermedia document that provides access to a value of a parameter characterising access of the computing device to a communication network over which the computing device is operable to communicate, wherein the hypermedia document conforms to a data model for use by constrained devices. The processing circuitry is further configured to cause the application server to use the value of the parameter characterising access of the computing device to the communication network to prepare an interaction with the resource hosted by the computing device, and to initiate the prepared interaction with the resource hosted by the computing device.

According to another aspect of the present disclosure, there is provided a method performed by a computing device, the method comprising exposing, to an application server, at least one resource hosted by the computing device, and providing, to the application server, a hypermedia document that provides access to a value of a parameter characterising access of the computing device to a communication network over which the computing device is operable to communicate. The hypermedia document conforms to a data model for use by constrained devices.

According to another aspect of the present disclosure, there is provided a method performed by an application server, the method comprising discovering at least one resource hosted by a computing device, and receiving, from the computing device, a hypermedia document that provides access to a value of a parameter characterising access of the computing device to a communication network over which the computing device is operable to communicate, wherein the hypermedia document conforms to a data model for use by constrained devices. The method further comprises using the value of the parameter characterising access of the computing device to the communication network to prepare an interaction with the resource hosted by the computing device, and initiating the prepared interaction with the resource hosted by the computing device.

According to another aspect of the present disclosure, there is provided a computer program comprising instructions which, when executed on at least one processor, cause the at least one processor to carry out a method according to any one of the aspects or examples of the present disclosure.

According to another aspect of the present disclosure, there is provided a carrier containing a computer program according to the preceding aspect of the present disclosure, wherein the carrier comprises one of an electronic signal, optical signal, radio signal or computer readable storage medium.

According to another aspect of the present disclosure, there is provided a computer program product comprising non transitory computer readable media having stored thereon a computer program according to a preceding aspect of the present disclosure.

BRIEF DESCRIPTION OF THE DRAWINGS

For a better understanding of the present disclosure, and to show more clearly how it may be carried into effect, reference will now be made, by way of example, to the following drawings in which.

DETAILED DESCRIPTION

Figure 1:
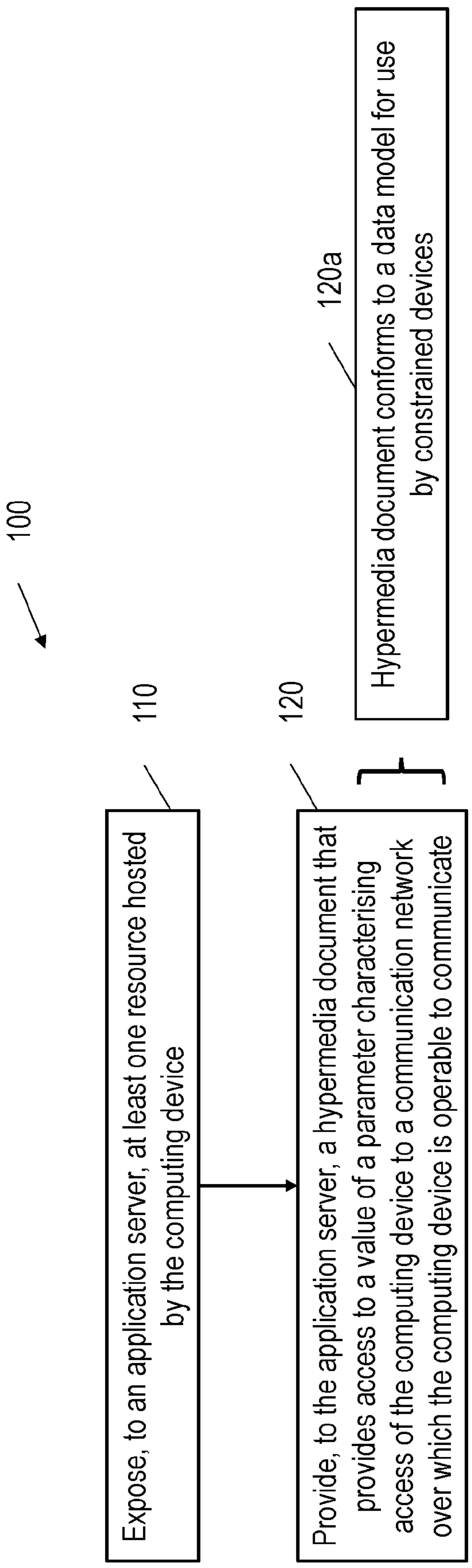
FIG. 1 is a flow chart illustrating process steps in a method performed by a computing device.

Aspects of the present disclosure provide methods, a computing device and an application server, according to which network access information for the computing device is provided to the application server via a hypermedia document. For the purposes of the present disclosure, a "document" comprises a set of structured information. The information may be generated and/or input to the structured set at the time the document is presented, and/or may be stored in the structured form of the document. A hypermedia document comprises a document that contains at least one element of hypermedia, as discussed below.

The concept of hypermedia for the Internet of Things can aid in the discovery, access and interoperability of heterogeneous IoT devices. Based on familiar Web technologies for humans browsing the Web, hypermedia for IoT can be used to describe how IoT devices can access and operate other IoT devices ("machine-to-machine"). A hypermedia document provides a run-time mapping from the abstract interactions that an IoT device is allowed to perform to the concrete protocol operations that enable the device to perform such interactions. This includes the Web transfer protocol to be used (for example, CoAP or HTTP), the protocol method to be invoked, and the data to be submitted.

At its core, a hypermedia document consists of a list of Uniform Resource Locators (URLs), from which list a client may selects the "best" URL for a given interaction. What constitutes the "best" URL depends on the specific application and the current application state. The selection of a suitable URL is facilitated by metadata associated with each URL, the metadata and URLs together forming the hypermedia controls of the document. The metadata typically consists of key-value pairs, with the keys being drawn from a standardised vocabulary.

The Constrained RESTful Application Language (CoRAL) is an evolving standard for hypermedia documents. CoRAL is optimised for IoT use cases by encoding the list of URLs and associated metadata in a compact, easy to process format that is suitable even for devices with constrained system resources such as microcontrollers.

Examples of the present disclosure propose that access to network access information for a computing device may be provided via a hypermedia document that is provided to an application server. The network access information may be included in the hypermedia document, or the hypermedia document may include a pointer to the network access information. The network access information exchanged in such a way may include dynamic information, such as information relating to changing network conditions, which information can be regularly updated in a new hypermedia document.

Many hypermedia formats, including CoRAL, are agnostic of the application-specific vocabularies which may be used to describe the metadata of the various URLs included in a hypermedia document. For example, in its current version, CoRAL defines only a minimal vocabulary for the most common metadata items. In particular, CoRAL does not define a vocabulary for the various capabilities of access technologies to interact optimally with a given IoT device. In addition, the use of network capabilities by hypermedia agents using CoRAL (for example application servers operable to exchange hypermedia documents and use the information provided therein) is not defined for any access network.

Examples of the present disclosure propose an application server that is network-capability aware, and able to use a new vocabulary, which may be a CoRAL vocabulary, for discovering and using information about network capabilities related to REST resources on a computing device. Examples of the hypermedia format and vocabulary proposed in the present disclosure may enable use of this information as part of application data (hypermedia) exchange. A hypermedia client that is aware of the format and vocabulary will be able to optimise its communication with an IoT device accordingly.

FIG. 1 is a flow chart illustrating process steps in a method 100 performed by a computing device. Referring to FIG. 1, the method 100 comprises, in a first step 110, exposing, to an application server, at least one resource hosted by the computing device. The method 100 further comprises providing, to the application server, a hypermedia document that provides access to a value of a parameter characterising access of the computing device to a communication network over which the computing device is operable to communicate. As illustrated at 120*a*, the hypermedia document conforms to a data model for use by constrained devices. The communication network over which the computing device is operable to communicate, and access to which by the computing device is characterised by the parameter, may be a communication network over which the computing device is operable to communicate with any other logical or physical entity. The computing device may therefore be operable to communication with the application server over the communication network. In another example, the computing device may be configured to communicate specifically with the application server over the communication network.

The provision, according to the method 100, of access to a value of a parameter characterising access of the computing device to a communication network over which the computing device is operable to communicate, may enable the application server to adapt its behaviour to optimise interaction with the computing device. Interaction with the computing device may be between the application server and the computing device over the communication network, or the application server may initiate interaction with the computing device via another entity, such as another server.

According to examples of the present disclosure, the computing device may comprise an Internet of Things (IoT), or Machine to Machine (M2M) device, and the IoT or M2M device may comprise a constrained device. For the purposes of the present disclosure, a constrained device comprises a device which conforms to the definition set out in section 2.1 of RFC 7228 for "constrained node".

According to the definition in RFC 7228, a constrained device is a device in which "some of the characteristics that are otherwise pretty much taken for granted for Internet nodes at the time of writing are not attainable, often due to cost constraints and/or physical constraints on characteristics such as size, weight, and available power and energy. The tight limits on power, memory, and processing resources lead to hard upper bounds on state, code space, and processing cycles, making optimization of energy and network bandwidth usage a dominating consideration in all design requirements. Also, some layer-2 services such as full connectivity and broadcast/multicast may be lacking". Constrained devices are thus clearly distinguished from server systems, desktop, laptop or tablet computers and powerful mobile devices such as smartphones. A constrained device may for example comprise a Machine Type Communication device, a battery powered device or any other device having the above discussed limitations. Examples of constrained devices may include sensors measuring temperature, humidity and gas content, for example within a room or while goods are transported and stored, motion sensors for controlling light bulbs, sensors measuring light that can be used to control shutters, heart rate monitor and other sensors for personal health (continuous monitoring of blood pressure etc.) actuators and connected electronic door locks. A constrained network correspondingly comprises "a network where some of the characteristics pretty much taken for granted with link layers in common use in the Internet at the time of writing are not attainable", and more generally, may comprise a network comprising one or more constrained devices as defined above.

A resource hosted by a computing device may comprise a digital interface that gives access to information or to actuation capabilities. The information may in some examples relate to one or more aspects of a physical entity, and the actuation capabilities may be executable on a physical entity. One or more resources hosted by a computing device may be organised into data objects, and may confirm to one or more object models. Examples of resources may include sensor readings such as temperature, pressure or humidity, entity status for a physical entity such as a valve or door (open, closed etc.), or a physical or chemical process (x % complete) and actuation capabilities including opening, closing, ignition, heating, cooling, etc.

A data model for use by constrained devices and to which the hypermedia document conforms comprises a data model that is adapted for, intended for or suitable for use by constrained devices. An example of a data model for use by constrained devices comprises the data model defined in the Constrained RESTful Application Language (CoRAL). Other examples include the Constrained RESTful Environments (CoRE) link format as defined in RFC 6690, and potential future versions of languages such as the Hypertext Application Language (HAL) that may be redesigned to be suitable for constrained environments.

Figure 2:
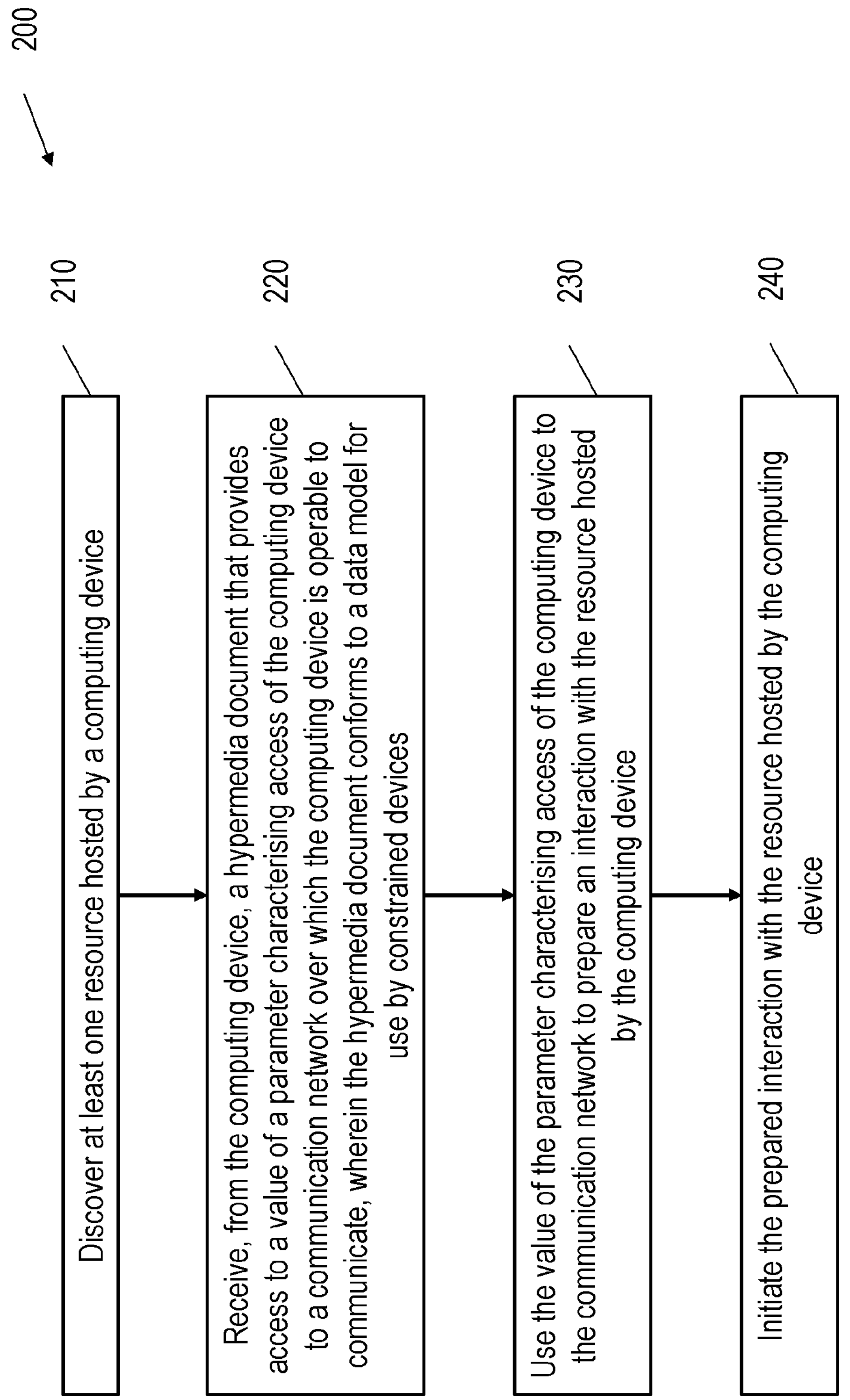
FIG. 2 is a flow chart illustrating process steps in a method performed by an application server.

The method 100 may be complimented by a method 200 performed by an application server. FIG. 2 is a flow chart illustrating process steps in a method 200 performed by an application server, which may be a physical server or a virtualised function running in a cloud, edge cloud or fog deployment. Referring to FIG. 2, the method 200 comprises, in a first step 210, discovering at least one resource hosted by a computing device. In step 220, the method 200 comprises receiving, from the computing device, a hypermedia document that provides access to a value of a parameter characterising access of the computing device to a communication network over which the computing device is operable to communicate, wherein the hypermedia document conforms to a data model for use by constrained devices. The method 200 further comprises, in step 230, using the value of the parameter characterising access of the computing device to the communication network to prepare an interaction with the resource hosted by the computing device, and, in step 240, initiating the prepared interaction with the resource hosted by the computing device. As discussed above with reference to FIG. 1, the communication network over which the computing device is operable to communicate, and access to which by the computing device is characterised by the parameter, may be a communication network over which the computing device is operable to communicate with any other logical or physical entity. The computing device may therefore be operable to communication with the application server over the communication network. In another example, the computing device may be configured to communicate specifically with the application server over the communication network. The interaction with the computing device initiated by the application server may be between the application server and the computing device over the communication network, or the application server may initiate interaction with the computing device via another entity, such as another server.

According to the method 200, the application server thus obtains the hypermedia document provided by the computing device according to the method 100, and uses the network access information to which the hypermedia document gives access to prepare an interaction with the resource in accordance with the information. This may include for example selecting a time or a method for the interaction based on the provided information, so as to optimise according to one or more parameters the execution of the interaction.

Figure 3A:
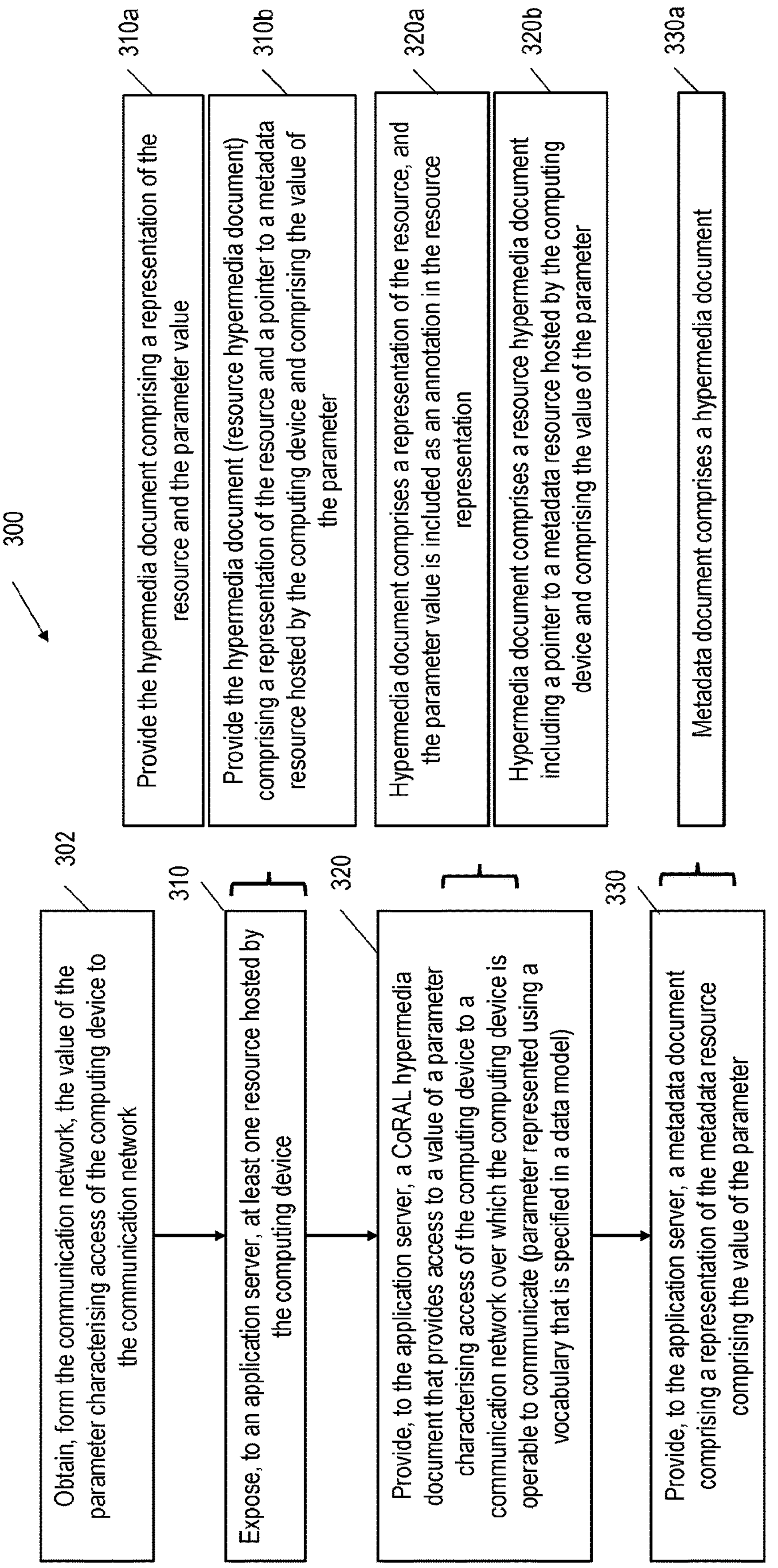
FIGS. 3*a* and 3*b* show a flow chart illustrating process steps in another example of a method performed by a computing device.
Figure 3B:
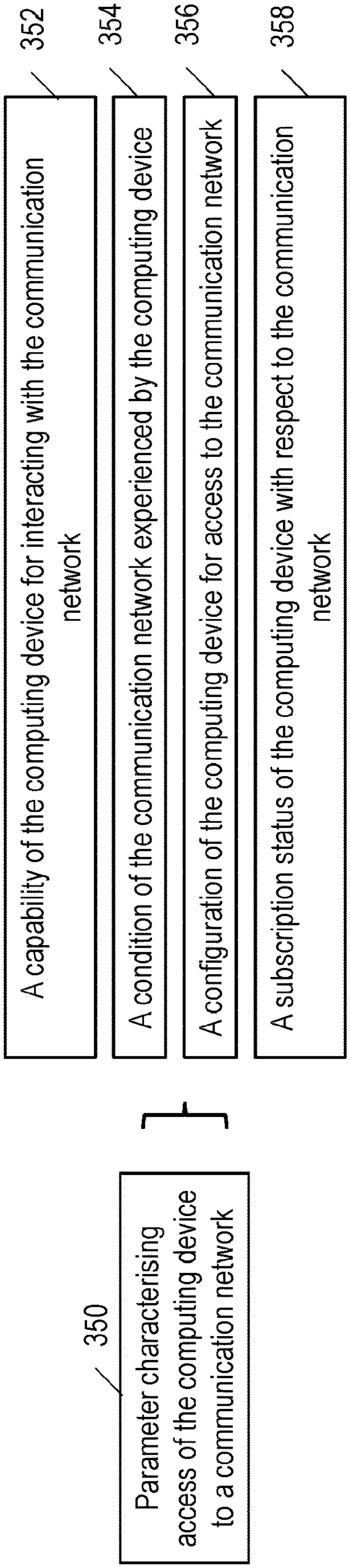

FIGS. 3*a* and 3*b* show a flow chart illustrating process steps in a further example of method 300 performed by a computing device. The computing device may for example be a constrained device as discussed above with reference to FIG. 1. The steps of the method 300 illustrate one example way in which the steps of the method 100 may be implemented and supplemented in order to achieve the above discussed and additional functionality.

Referring first to FIG. 3*a*, according to the method 300, in a first step 302, the computing device obtains, from a communication network, a value of a parameter characterising access of the computing device to the communication network. For example, the computing device may be operable to access a 3GPP network, and may query the network (for example using the 3GPP SCEF APIs discussed above) to retrieve information about the network, the information including at least one value of at least one parameter that characterises the device's access. Examples of what the parameter may comprise are discussed in greater detail with reference to FIG. 3*b* below.

In step 310, the computing device exposes, to an application server, at least one resource hosted by the computing device. The computing device may expose the resource for example by registering the resource in a suitable resource Directory function, or by responding to a discovery request. Exposing the resource may in some examples comprise providing a hypermedia document, such as a CoRAL document, to the application server, the hypermedia document comprising a representation of the resource, including for example one or more URLs for accessing the resource. In some examples, as illustrated at 310*a*, such a hypermedia document may also include information about device network access, comprising a value of a parameter characterising device network access. In other examples, as illustrated in step 310*b*, the hypermedia document may comprise a resource hypermedia document, and may comprise a representation of the resource hosted by the computing device, and a pointer to a metadata resource hosted by the computing device and comprising a value of a parameter characterising access of the computing device to a communication network.

In step 320, the computing device provides, to the application server, a hypermedia document that provides access to a value of a parameter characterising access of the computing device to a communication network over which the computing device is operable to communicate, the hypermedia document conforming to a data model for use by constrained devices, as discussed above with reference to FIG. 1. As illustrated in 320, the hypermedia document may comprise a CoRAL document. The value of a parameter to which the hypermedia document provides access may for example be a value obtained in step 302, and/or may comprise a value of a parameter that is available to the computing device other than via the communication network. The hypermedia document may provide access to a plurality of key value pairs, each key value pair comprising a parameter identification (key), and a value for the parameter (value). The hypermedia document may provide access to values of a plurality of parameters characterising access of the computing device to the communication network. In some examples, the computing device may have access to more than one communication network, and the hypermedia document may provide access to, for each of a plurality of communication networks, values of one or more parameters characterising access of the computing device to the respective communication network.

In some examples, as illustrated at 320, the parameter characterising access of the computing device to a communication network over which the computing device is operable to communicate may be represented using a vocabulary that is specified in a data model. The use of vocabulary specified in a data model may assist in ensuring that the representation of parameter and parameter value can be understood by the application server. In a first option according to the present disclosure, the parameter or parameters value(s) may be included in the hypermedia document, which may also include a representation of the resource, and the parameter value(s) may for example be included as an annotation to the resource representation. In a second option according to the present disclosure, the parameter value(s) may be exposed as a metadata resource hosted by the computing device, and the hypermedia document may provide access to the parameter value(s) by including a pointer to the metadata resource. The parameter value(s) may in such examples be included in a separate metadata document provided to the application server, which document may or may not itself be a hypermedia document.

The first of the above discussed options is illustrated in steps 310*a* and 320*a* of FIG. 3, according to which the hypermedia document provided at step 320 comprises a representation of the resource hosted by the computing device, and the value(s) of the parameter(s) characterising access of the computing device to a communication network is/are included as an annotation in the resource representation of the hypermedia document. The representation of the resource comprises at least one hypermedia control for the resource. According to this option, steps 310 and 320 may be performed in a single interaction, according to which a single hypermedia document is provided to the application server, the hypermedia document comprising a representation of the hosted resource and a parameter value or values characterising network access of the computing device included as an annotation to the resource representation.

The second of the above discussed options is illustrated in steps 310*b* and 320*b* of FIG. 3, according to which the hypermedia document provided at step 320 is a resource hypermedia document comprising a representation of the resource and a pointer to a metadata resource hosted by the computing device and comprising the value of the parameter. According to this option, at step 330, the computing device may provide a metadata document which includes a representation of the metadata resource comprising the value(s) of the parameter(s) characterising access of the computing device to a communication network or networks. The metadata document may or may not also be a hypermedia document, as illustrated at 330*a*. The second option thus envisages the hypermedia document providing access to the parameter characterising network access via indirection, using a pointer to direct the application server to a separate resource containing the network access information. While this second option envisages an additional interaction with the application server, in order to provide the two separate documents (a hypermedia document and a second document which may or may not be a hypermedia document), the second option offers economies of scale, as the network access information is provided in a separate resource, as opposed to being included as an annotation to each resource hosted by the computing device. The relative advantages of the first and second options may vary according to a particular use case, deployment or implementation scenario.

FIG. 3*b* illustrates a range of options for the parameter that characterises access of the computing device to a communication network. It will be appreciated that the computing device may provide one or more values for any number of suitable parameters at step 120 or 320 of the above discussed methods, and any one or more of the parameters may fall within any one or more of the categories illustrated in FIG. 3*b*. Referring to FIG. 3*b*, the parameter characterising access of the computing device to a communication network may comprise at least one of:

a) a capability of the computing device for interacting with the communication network
b) a condition of the communication network experienced by the computing device
c) a configuration of the computing device for access to the communication network
d) a subscription status of the computing device with respect to the communication network.

The following discussion of example parameters is provided merely for the purposes of illustration, and encompasses parameters appropriate for C-IoT networks and parameters appropriate for LoRaWAN networks.

An interaction capability parameter may for example comprise Non-IP Data Delivery (NIDD) availability, supported radio capabilities, supported frequency bands, supported uplink data rate, supported downlink data rate, device class, etc.

A network condition parameter may for example comprise signal strength, bandwidth, spreading factor, beacon interval, availability of multicast, etc.

An access configuration parameter may for example comprise Power Save Mode (PSM) status, Discontinuous Reception (DRX) and Extended Discontinuous Reception (eDRX) patterns, synchronisation, network slice identification, Ethernet segment, etc.

A subscription status parameter may for example comprise roaming status.

As discussed above, the parameter characterising access of the computing device to a communication network may be represented, in the hypermedia document or the metadata document, using a vocabulary that is specified in a data model. The parameter or parameters may be represented using a plurality of key-value pairs, and the vocabulary terms, that is the keys of the key value pairs, may conform to the same data model for use by constrained devices to which the hypermedia document conforms. Thus for example, if the hypermedia document is a CoRAL document, the vocabulary terms used to represent the parameter or parameters may conform to the CoRAL specification. The vocabulary terms may comprise globally unique identifiers, commonly constructed as URIs. Details of CoRAL vocabulary terms may be found in section 6.2 of the CoRAL specification: https://www.ietf.org/id/draft-ietf-core-coral-03.html #name-minting-vocabulary. The vocabulary used to represent the parameter or parameters may be an extension of existing vocabulary, or a new vocabulary. It will be appreciated that multiple vocabularies may be used together, and identifiers in existing vocabularies that are not globally unique can be rendered globally unique by providing a globally unique prefix for them. The examples provided below use the globally unique prefix "http://vocabulary.example.org/Ite#", but it will be appreciated that the "example.org" may be replaced with the domain name of an organization, for example the organization seeking to standardise a vocabulary.

Figure 4:
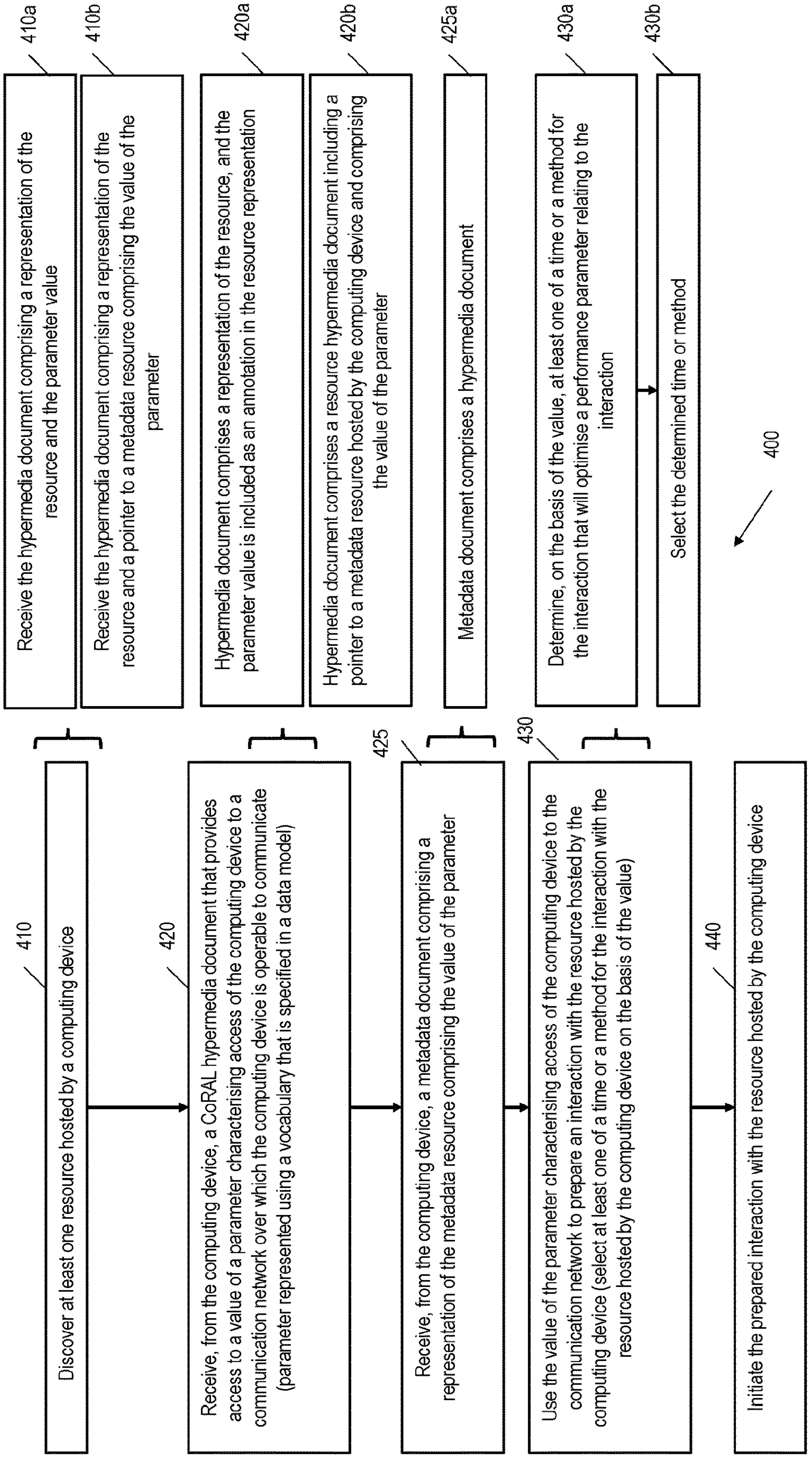
FIG. 4 is a flow chart illustrating process steps in another example of a method performed by an application server.

As discussed above with reference to FIG. 2, methods carried out at a computing device as discussed herein may be complemented by a method 200 performed by an application server. FIG. 4 shows a flow chart illustrating process steps in a further example of method 400 performed by an application server, which may be a physical server apparatus or a virtualised application server running in a cloud, edge cloud or fog deployment. The application server may comprise a hypermedia agent, in that it may be operable to use hypermedia documents.

The steps of the method 400 illustrate one example way in which the steps of the method 200 discussed above may be implemented and supplemented in order to achieve the above discussed and additional functionality.

Referring to FIG. 4, according to the method 400, in a first step 410, the application server discovers at least one resource hosted by a computing device. This may comprise for example querying a Resource Directory function or sending a discovery request to a suitable unicast or multicast address and receiving a discovery response. Discovering the resource may in some examples comprise receiving a hypermedia document, such as a CoRAL document, from the computing device, the hypermedia document comprising a representation of the resource, including for example one or more URLs for accessing the resource. In some examples, as illustrated at 410*a*, such a hypermedia document may also include information about device network access. In other examples, as illustrated in step 410*b*, the hypermedia document may comprise a resource hypermedia document, and may comprise a representation of the resource hosted by the computing device, and a pointer to a metadata resource hosted by the computing device and comprising a value of a parameter characterising access of the computing device to a communication network.

In step 420, the application server receives, from the computing device, a hypermedia document that provides access to a value of a parameter characterising access of the computing device to a communication network over which the computing device is operable to communicate, the hypermedia document conforming to a data model for use by constrained devices, as discussed above with reference to FIG. 1. As discussed above, the communication network over which the computing device is operable to communicate, and access to which by the computing device is characterised by the parameter, may be a communication network over which the computing device is operable to communicate with any other logical or physical entity. The computing device may therefore be operable to communication with the application server over the communication network. In another example, the computing device may be configured to communicate specifically with the application server over the communication network.

As illustrated in 420, the hypermedia document may comprise a CoRAL document. The hypermedia document may provide access to a plurality of key value pairs, each key value pair comprising a parameter identification (key), and a value for the parameter (value). The hypermedia document may provide access to values of a plurality of parameters characterising access of the computing device to the communication network. In some examples, the computing device may have access to more than one communication network, and the hypermedia document may provide access to, for each of a plurality of communication networks, values of one or more parameters characterising access of the computing device to the respective communication network. Examples of what the parameter or parameters may comprise are discussed in greater detail with reference to FIG. 3*b* above.

In some examples, as illustrated at 420, the parameter characterising access of the computing device to a communication network over which the computing device is operable to communicate may be represented using a vocabulary that is specified in a data model. The use of vocabulary specified in a data model may assist in ensuring that the representation of parameter and parameter value can be understood by the application server. As discussed above with reference to FIG. 3*a*, in a first option according to the present disclosure, the parameter or parameters value(s) may be included in the hypermedia document, which may also include a representation of the resource, and the parameter(s) value(s) may for example be included as an annotation to the resource representation. In a second option according to the present disclosure, the parameter(s) value(s) may be exposed as a metadata resource hosted by the computing device, and the hypermedia document may provide access to the parameter value(s) by including a pointer to the metadata resource. The parameter value(s)

may, in such examples, be received in a separate metadata document, which document may or may not itself be a hypermedia document.

The first of the above discussed options is illustrated in steps 410*a* and 420*a* of FIG. 4, according to which the hypermedia document received at step 420 comprises a representation of the resource hosted by the computing device, and the value(s) of the parameter(s) characterising access of the computing device to a communication network is/are included as an annotation in the resource representation of the hypermedia document. The representation of the resource comprises at least one hypermedia control for the resource. According to this option, steps 410 and 420 may be performed in a single interaction, according to which a single hypermedia document is received by the application server, the hypermedia document comprising a representation of the hosted resource and a parameter value or values characterising network access of the computing device included as an annotation to the resource representation.

The second of the above discussed options is illustrated in steps 410*b* and 420*b* of FIG. 4, according to which the hypermedia document received at step 410*b* is a resource hypermedia document comprising a representation of the resource and a pointer to a metadata resource hosted by the computing device and comprising the value of the parameter. According to this option, at step 425, the application server may receive a metadata document which includes a representation of the metadata resource comprising the value(s) of the parameter(s) characterising access of the computing device to a communication network or networks. The metadata document may or may not also be a hypermedia document, as illustrated at 425*a*. The application server may for example send a discovery request for the metadata resource indicated by the pointer, prompting the computing device to provide the metadata document.

In step 430, the application server uses the value or values of the parameter or parameters characterising access of the computing device to the communication network to prepare an interaction with the resource hosted by the computing device. As illustrated in FIG. 4, this may comprise selecting at least one of a time or a method for the interaction with the resource hosted by the computing device on the basis of the value. As illustrated at steps 430*a* and 430*b*, selecting at least one of a time or a method for the interaction with the resource hosted by the computing device on the basis of the value may comprise determining, on the basis of the value, at least one of a time or a method for the interaction that will optimise a performance parameter relating to the interaction, and selecting the determined time or method.

A suitable performance parameter for an interaction with a resource may be selected or defined according to the nature of the resource and interaction, use case etc. Example performance parameters for resource interactions may include cost, chance of success, network resource usage, etc. For example, an application server may delay or advance a planned interaction with a resource in order to synchronise with a computing device DRX cycle, or may delay execution of non-critical commands until network conditions are favourable. In other examples, an application server may select either polling for information or use of an Observe procedure, according to network conditions, and/or access availability for the computing device. In a still further example, an application server may balance the computational cost of compressing data against the available bandwidth for communicating with the computing device, and so may either select a suitable method (compressing or not compressing data) and/or a suitable time (delaying the sending of data until more bandwidth is available) according to operational priorities for the application server and the network access information obtained in the hypermedia document.

In step 440, the application server initiates the prepared interaction with the resource hosted by the computing device. This may comprise sending a message to the computing device, instructing another entity to send a message, etc. In some examples, the interaction with the computing device may be between the application server and the computing device over the communication network. In other examples, the application server may initiate interaction with the computing device via another entity, such as another server.

The following discussion provides example details of how the above methods may be implemented to facilitate the provision of network access information for a computing device to an application server, using a hypermedia document. As discussed above, the network access information may in some examples be included as metadata about resource URLs in the hypermedia document, or as a separate metadata resource. In order to include this metadata, it is helpful to define a vocabulary for describing network related capabilities and features needs to be defined. This vocabulary could, for example, include terms for information relating to a 3GPP C-IoT User Equipment (UE) about the roaming status of the UE, Power Save Mode (PSM) status, DRX or eDRX cycle length, NIDD availability, signal strength (for example allowing the application server to choose to communicate when the signal quality is judged to be adequate), synchronization, allowing the communication to skip initial search for synchronisation, supported radio capabilities (modulation methods etc.), supported frequency bands, supported uplink data rate, supported downlink data rate, etc. For a LoRaWAN device the information could include Device Class (A, B or C), bandwidth, spreading factor, beacon interval or availability of multicast.

As discussed above, a device on a 3GPP network can query the network (for example using the 3GPP SCEF APIs) to retrieve information about the network and, when acting as a server, publish this information as metadata using the proposed vocabulary in a CoRAL or other hypermedia document or as a resource that is indicated by such a document. Similarly, a device on a LoRaWAN network could indicate the beacon period or unicast/multicast availability of the network in a CoRAL or other hypermedia document. Clients (applications) interacting with these computing devices would use the published information to choose how to interact with them.

Example Use Case 1: Firmware Updates Over 3GPP

Figure 5:
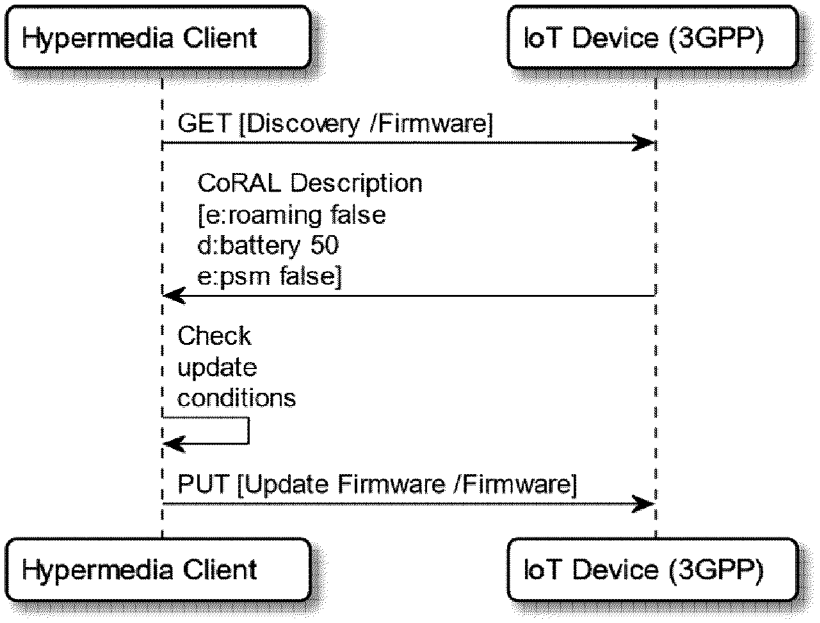
FIG. 5 is a message flow diagram illustrating communication between a computing device and an application server.

When performing device firmware updates, device management protocols typically take only the device's properties (device type, battery, IP connectivity etc.) into account, but do not consider network properties (roaming, PSM, DRX, eDRX, NIDD availability, reachability etc). According to examples of the present disclosure, device management protocols also can take network properties into account. For example, if a fleet of heterogeneous devices requires firmware updates within a certain period of time, the following steps could be performed, as illustrated in FIG. 5:

1. The Application Server (AS) performs a discovery operation on the device.

2. The device returns a CoRAL document with information on how to update its firmware, including certain device properties and (in bold) network properties.

```
#using f = <http://vocabulary.example.org/firmware#>
#using c = <http://vocabulary.example.org/coap#>
#using e = <http://vocabulary.example.org/lte#>
#using d = <http://vocabulary.example.org/device#>
f:update -> </firmware> {
  c:method      "PUT"
  c:accept      "application/vnd.example.firmware"
  e:roaming     false
  d:battery     50
  e:psm         false
}
```

In this example document, the network properties include whether the device is roaming or not (using the term e:roaming from an exemplary vocabulary) and its PSM status (using the term e:psm).

3. To ensure that the firmware updates are both successful and inexpensive, the AS does not perform a firmware update while the device is roaming, while the battery level is low, or while PSM is active.
4. Once the AS has verified that the device is in a suitable condition, and experiencing appropriate network conditions, to receive its firmware update, the AS triggers the firmware update process (using the PUT method on the </firmware> resource, or instructing another server to perform the update on the AS's behalf).

Example Use Case 2: Firmware Updates Over LoRaWAN

When using LoRaWAN, firmware updates can also account for LoRa network properties, including for example device class, beacon-period, unicast/multicast mode, transmission power, channel, ping period, etc.

Continuing the previous example, the firmware updates of a fleet of mobile or wall-mounted devices could be optimized for battery consumption (LoRaWAN Class B), using the following steps:

1. The updater performs a discovery operation on the LoRaWAN device.
2. The device returns a CoRAL document with information on how to update its firmware, including certain device properties and (in bold) network properties.

```
#using f = <http://vocabulary.example.org/firmware#>
#using c = <http://vocabulary.example.org/coap#>
#using w = <http://vocabulary.example.org/lorawan#>
#using d = <http://vocabulary.example.org/device#>
f:update -> </firmware> {
  c:method         "PUT"
  c:accept         "application/vnd.example.firmware"
  w:device-class   "B"
  d:battery        50
  w:b-period       400
}
```

In this example document, the network properties include whether the device is of LoRaWAN Class B (using the term w:device-class from an exemplary vocabulary) and, if so, information for synchronizing the reception window (w:b-period).

2. To ensure that the firmware updates are both successful and inexpensive, these updates could only be performed on Class B devices using the specified synchronization window (synchronization happening every 400 seconds in the present example).
3. Once the updater has verified that the device is in a suitable condition, and experiencing appropriate network conditions, to receive its firmware update, it triggers the firmware update process (using the PUT method on the </firmware> resource, or instructing another server to perform the update on the AS's behalf).

The above two example use cases illustrate the first option for provision of network access information discussed above with reference to FIGS. 3*a* and 4. That is, in the above examples, the key value pairs for parameters characterising computing device network access were included as annotations to the firmware update resource representation. This option envisages that all resources exposed by the computing device, and for which it is desirable to allow an application server to consider network access information, should be annotated with the appropriate network access information. The following example considers the second option, in which the network access information is provided as a separate metadata resource.

Example Use Case 3: Network Information Indirection

Instead of annotating many or all hypermedia controls (resource representation and metadata) with network information, the computing device can provide a pointer to a resource with this information in the hypermedia document. As discussed above, this results in more interactions with the device (retrieving the additional resource), but avoids repeating the information in all the exchanged hypermedia documents. A suitable pointer is illustrated below:

```
#using f = <http://vocabulary.example.org/firmware#>
#using c = <http://vocabulary.example.org/coap#>
#using n = <http://vocabulary.example.org/network#>
n:information </current-network-information.senml>
f:update -> </firmware> {
  c:method      "PUT"
  c:accept      "application/vnd.example.firmware"
}
```

The methods 100, 300, 200 and 400, as illustrated in the above example use cases, are performed by a computing device and an application server respectively. The present disclosure provides a computing device and an application server which are adapted to perform any or all of the steps of the above discussed methods.

Figure 6:
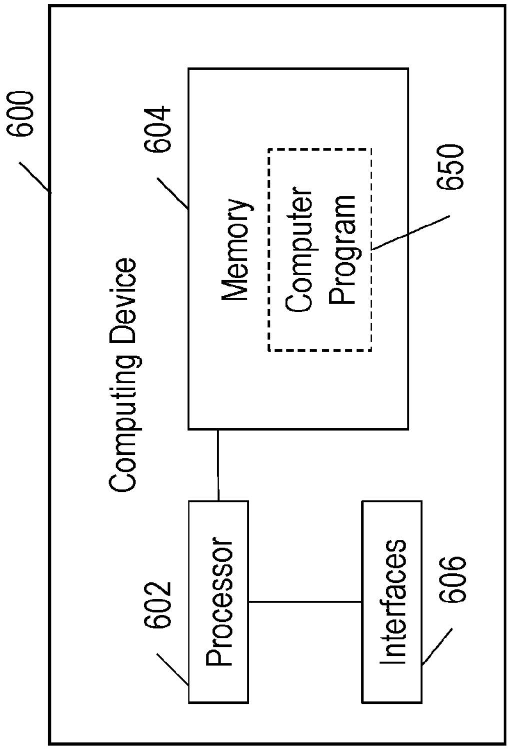
FIG. 6 is a block diagram illustrating functional modules in a computing device.

FIG. 6 is a block diagram illustrating a computing device 600 which may implement the method 100 and/or 300 according to examples of the present disclosure, for example on receipt of suitable instructions from a computer program 650. Referring to FIG. 6, the computing device 600 comprises a processor or processing circuitry 602, and may comprise a memory 604 and interfaces 606, such as a CoAP, HTTP, 3GPP radio or other interface. The processing circuitry 602 is operable to perform some or all of the steps of the method 100 and/or 300 as discussed above with reference to FIGS. 1, 3*a* and 3*b*. The memory 604 may contain instructions executable by the processing circuitry 602 such that the computing device 600 is operable to perform some or all of the steps of the method 100 and/or 300. The instructions may also include instructions for executing one or more telecommunications and/or data communications protocols. The instructions may be stored in the form of the computer program 650.

Figure 7:
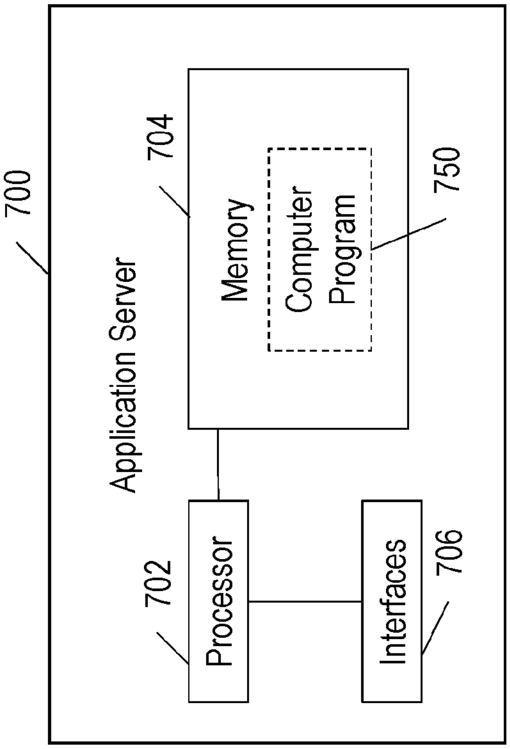
FIG. 7 is a block diagram illustrating functional modules in an application server.

FIG. 7 is a block diagram illustrating an application server 700 which may implement the method 200 and/or 400 according to examples of the present disclosure, for example on receipt of suitable instructions from a computer program 750. Referring to FIG. 7, the application server 700 comprises a processor or processing circuitry 702, and may comprise a memory 704 and interfaces 706 such as a CoAP, HTTP, 3GPP radio or other interface. The processing circuitry 702 is operable to perform some or all of the steps of the method 200 and/or 400 as discussed above with reference to FIGS. 2, and 4. The memory 704 may contain instructions executable by the processing circuitry 702 such that the application server 700 is operable to perform some or all of the steps of the method 200 and/or 400. The instructions may also include instructions for executing one or more telecommunications and/or data communications protocols. The instructions may be stored in the form of the computer program 750.

In some examples, the processor or processing circuitry 702, 802 described above may include one or more microprocessors or microcontrollers, as well as other digital hardware, which may include digital signal processors (DSPs), special-purpose digital logic, etc. The processor or processing circuitry 702, 802 may be implemented by any type of integrated circuit, such as an Application Specific Integrated Circuit (ASIC), Field Programmable Gate Array (FPGA) etc. The memory 704, 804 may include one or several types of memory suitable for the processor, such as read-only memory (ROM), random-access memory, cache memory, flash memory devices, optical storage devices, solid state disk, hard disk drive etc.

Aspects and examples of the present disclosure thus propose a computing device, application server, and associated methods that may enable the device to provide network access information, such that the application server may optimise its interactions with the device on the basis of the conditions and capabilities of the access networks of the device. The methods, device and application server may be supported by a vocabulary for expressing parameters characterising access of the computing device to a communication network. The vocabulary may for example allow for concise representation of the parameters, thus being suitable for use by constrained devices, and may be compatible with, and for example standardised in, the CoRAL application language. Examples of the present disclosure enable a computing device to guide application servers as hypermedia clients towards communication with the devices that is optimised at the network level. For example a computing device could indicate that the best way to interact with it is for a client to delay the execution of a non-time-critical command until the network conditions allow for an optimal execution. In another example, a client could choose not to poll an IoT sensor but rather receive periodic notifications while the sensors network is congested, while the sensor has a high uplink cost, or while the uplink is not available. In a still further example, a client could choose whether or not to compress data to be sent to a device depending on the link conditions (coding complexity vs. network access use) and characteristics (available bandwidth etc.) The use of hypermedia documents for the provision of the network access information ensure that this information can be dynamically updated to reflect evolving conditions in the network, changing device circumstances etc.

It will be appreciated that examples of the present disclosure may be virtualised, such that the methods and processes described herein may be run in a cloud environment.

The methods of the present disclosure may be implemented in hardware, or as software modules running on one or more processors. The methods may also be carried out according to the instructions of a computer program, and the present disclosure also provides a computer readable medium having stored thereon a program for carrying out any of the methods described herein. A computer program embodying the disclosure may be stored on a computer readable medium, or it could, for example, be in the form of a signal such as a downloadable data signal provided from an Internet website, or it could be in any other form.

It should be noted that the above-mentioned examples illustrate rather than limit the disclosure, and that those skilled in the art will be able to design many alternative embodiments without departing from the scope of the appended claims. The word "comprising" does not exclude the presence of elements or steps other than those listed in a claim, "a" or "an" does not exclude a plurality, and a single processor or other unit may fulfil the functions of several units recited in the claims. Any reference signs in the claims shall not be construed so as to limit their scope.

The invention claimed is:

1. A computing device comprising processing circuitry configured to cause the computing device to:

expose, to an application server, at least one resource hosted by the computing device; and provide, to the application server, a hypermedia document that provides access to a value of a parameter characterising access of the computing device to a communication network over which the computing device is operable to communicate, wherein the parameter characterising access comprises a condition of the communication network experienced by the computing device, and wherein the condition of the communication network comprises one or more of signal strength, bandwidth, spreading factor, beacon interval, and availability of broadcast or multicast; and receive, from the application server, a request for the at least one resource hosted by the computing device, wherein the request is received based at least in part on the parameter characterising access of the computing device to the communication network;

wherein the hypermedia document conforms to a data model for use by constrained devices.

2. The computing device as claimed in claim 1, wherein the parameter characterising access of the computing device to a communication network further comprises at least one of:

a capability of the computing device for interacting with the communication network;

a configuration of the computing device for access to the communication network;

a subscription status of the computing device with respect to the communication network.

3. The computing device as claimed in claim 1, wherein the hypermedia document comprises the value of a parameter characterising access of the computing device to a communication network over which the computing device is operable to communicate.

4. The computing device as claimed in claim 1, wherein the hypermedia document comprises a representation of the resource hosted by the computing device, and wherein the value of the parameter characterising access of the computing device to a communication network is included as an annotation in the resource representation.

5. The computing device as claimed in claim 1, wherein the processing circuitry is further configured to cause the computing device to expose, to the application server, at least one resource hosted by the computing device by:

providing, to the application server, the hypermedia document, wherein the hypermedia document comprises:

a representation of the resource hosted by the computing device; and a pointer to a metadata resource hosted by the computing device and comprising the value of the parameter characterising access of the computing device to a communication network.

6. The computing device as claimed in claim 5, wherein the hypermedia document comprises a resource hypermedia document, and wherein the processing circuitry is further configured to cause the computing device to provide to the application server a metadata document comprising a representation of the metadata resource comprising the value of the parameter characterising access of the computing device to a communication network.

7. The computing device as claimed in claim 6, wherein the metadata document comprises a hypermedia document.

8. The computing device as claimed in claim 1, wherein the parameter characterising access of the computing device to a communication network over which the computing device is operable to communicate is represented using a vocabulary that is specified in a data model.

9. The computing device as claimed in claim 1, wherein the processing circuitry is further configured to cause the computing device to:

obtain, from the communication network, the value of the parameter characterising access of the computing device to the communication network.

10. The computing device as claimed in claim 1, wherein the hypermedia document comprises a Constrained RESTful Application Language, CoRAL, document.

* * * * *